United States Patent
Rangarajan et al.

(10) Patent No.: US 7,921,266 B2
(45) Date of Patent: Apr. 5, 2011

(54) SYSTEM AND METHOD OF ACCESSING MEMORY WITHIN AN INFORMATION HANDLING SYSTEM

(75) Inventors: Madhusudhan Rangarajan, Round Rock, TX (US); Bi-Chong Wang, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 543 days.

(21) Appl. No.: 12/021,755

(22) Filed: Jan. 29, 2008

(65) Prior Publication Data

US 2009/0193204 A1 Jul. 30, 2009

(51) Int. Cl.
*G06F 12/00* (2006.01)
(52) U.S. Cl. ......... 711/158; 711/100; 711/151; 711/154
(58) Field of Classification Search .................. 711/100, 711/151, 154, 158, E12.001
See application file for complete search history.

(56) References Cited

U.S. PATENT DOCUMENTS

2006/0041779 A1* 2/2006 McKinty et al. ............... 714/4
2008/0137682 A1* 6/2008 Kish et al. ..................... 370/432

* cited by examiner

*Primary Examiner* — Jasmine Song
(74) *Attorney, Agent, or Firm* — Larson Newman & Abel, LLP

(57) ABSTRACT

A system and method of accessing memory within an information handling system are disclosed. In one form, a method of accessing memory can include detecting a first operating value of a first memory access node accessible to a first processor, and initiating operation of the first memory access node to a first data rate value. The method can also include initiating operation of a second memory access node to a second data rate value. In one form, the second data rate value can be different from the first data rate value. The method can also include enabling a first application access to either the first memory access node or the second memory access node via an operating system enabled by the processor.

17 Claims, 4 Drawing Sheets

SYSTEM AND METHOD OF ACCESSING MEMORY WITHIN AN INFORMATION HANDLING SYSTEM

FIELD OF THE DISCLOSURE

This disclosure relates generally to information handling systems, and more particularly to a system and method of accessing memory within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Some current information handling systems use memory devices and memory controllers in a multiple processor configurations. For example, an information handling system can include multiple memory controllers that can be used independently (un-ganged mode), or can be combined (ganged mode). For example, two 64-bit memory controllers located at a single node of a multiple core processor can operate independently to provide two 64-bit controllers for increased data performance. However, there may be a trade-off in performance when two 64-bit memory controller are combined as one 128-bit controller. For example, a central processing unit employing multiple core processors and a 128-bit memory controller can realize increased memory management reliability, but decreased performance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
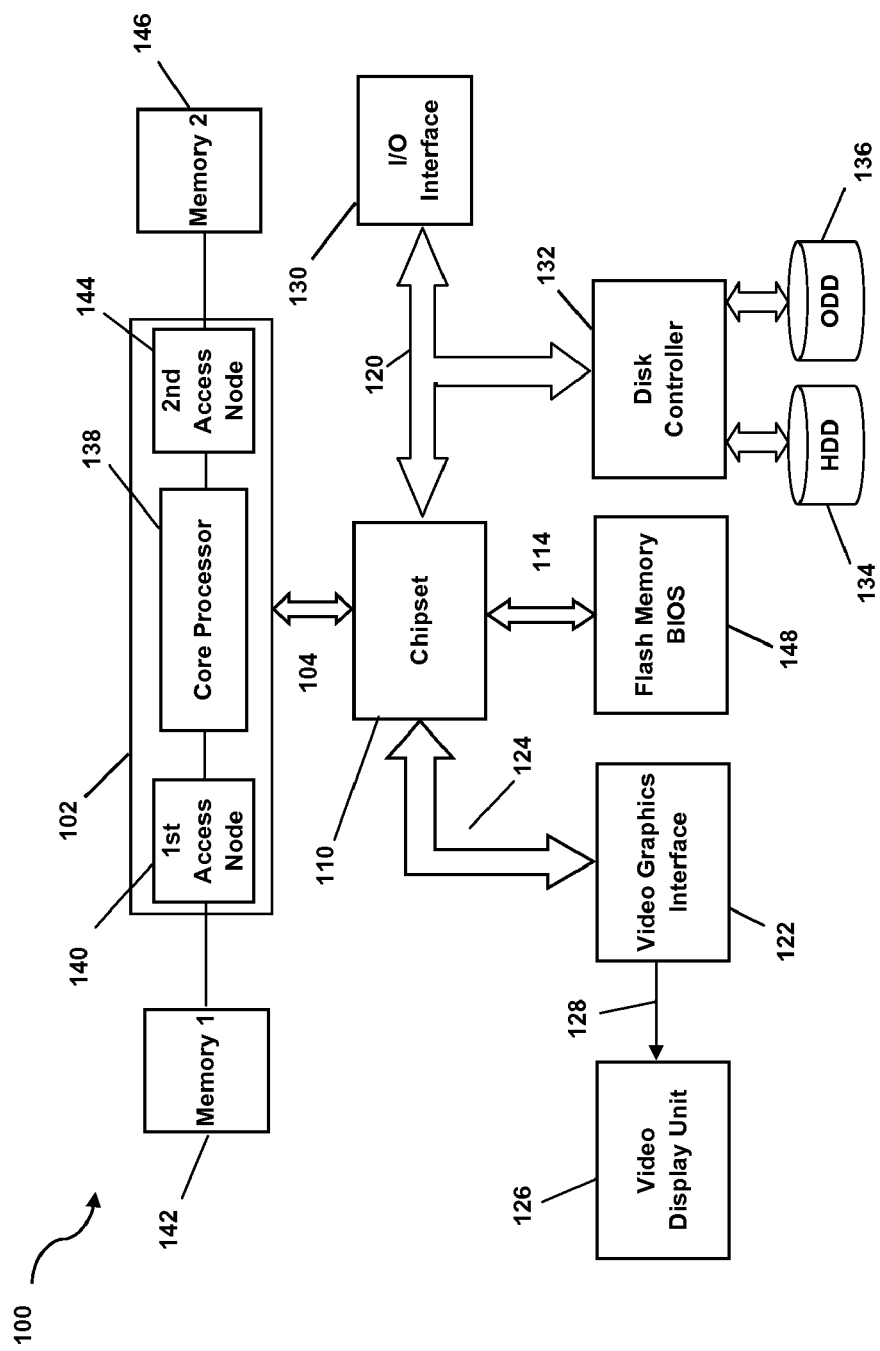
FIG. 1 illustrates a block diagram of an information handling system according to an aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of accessing memory is disclosed. The method can include detecting a first operating value of a first memory access node accessible to a first processor, and initiating operation of the first memory access node to a first data rate value. The method can also include initiating operation of a second memory access node to a second data rate value. In one form, the second data rate value can be different from the first data rate value. The method can also include enabling a first application access to either the first memory access node or the second memory access node via an operating system enabled by the processor.

According to another aspect of the disclosure, a multiple core processor is disclosed. The method core processor can include a first processor configured to access a first memory access node at a first data rate. The first processor can further be configured to be responsive to a first BIOS entry operable to enable access to the first memory access node. The multiple core processor can also include a second processor configured to access a second memory access node at a second data rate. The second processor can also be configured to be responsive to a second BIOS entry operable to enable access to the first memory access node. In one form, the first data rate can be different from a second data rate.

According to a further aspect of the disclosure, an information handling system is disclosed. The information handling system can include a first processor configurable to access a grouped memory access node using a first BIOS entry of a BIOS, and a second processor configurable to access an first ungrouped memory access node using a second BIOS entry of the BIOS. The information handling system can also include a first table accessible during a run time. The first table can be configured to enable a first non-critical application access to the grouped memory access node. The information handling system can also include a second table accessible during the run time. The second table can be configured to enable a first critical application access to the first ungrouped memory access node.

FIG. 1 illustrates a block diagram of an exemplary embodiment of an information handling system, generally designated at 100. In one form, the information handling system 100 can be a computer system such as laptop, server, desktop or other type of computer system. As shown in FIG. 1, the information handling system 100 can include a first physical processor 102 coupled to a first host bus 104. The information handling system 100 can also be configured to use more than one processor. The first physical processor 102 can be coupled to a chipset 110 via the first host bus 104. In one form, the chipset 110 can support multiple processors, and can also allow for simultaneous processing of multiple processors. The chipset 110 can also be configured to support the exchange, reading, writing, etc. of various combinations thereof, of information or data within information handling system 100 during multiple processing operations.

According to one aspect, the chipset 110 can be referred to as input/output (I/O) controller hub or a Southbridge. For example, the chipset 110 can include a dedicated bus to transfer data between first physical processor 102 and another processor (not illustrated). For example, the chipset 110 can be configured to operate as a memory controller hub and an input/output (I/O) controller hub. In a particular embodiment, the buses 104 and 114 can be individual buses, or part of the same bus. The chipset 110 can also include bus control and can handle transfers between the buses 104 and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to output video information to be displayed within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a PCI-Express bus. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the bus 114 configured as a low pin count (LPC) bus, the I/O bus 120 that can be operable as a PCI bus, and activities for the video graphics interface 122. The Northbridge portion can also communicate with the first physical processor 102 using first bus 104. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In one form, the processor 102 can include a core processor 138. The processor 102 can also include multiple core processors (not illustrated). The core processor 138 can be coupled to a first access node 140 operable to access a first memory 142. The core processor 102 can also be coupled to a second access node 144 operable to access a second memory 146. Additionally, the first memory access node 140, the second memory access node 144, or any combination thereof can be enabled internal or external to the processor 102. For example, the first memory 142 can be accessed via the first memory access node 140 operable to be coupled to the host bus 104.

According to another aspect, the information handling system 100 includes a BIOS 148 operable to be couple to the processor 102. For example, the BIOS 148 can be accessed by the processor 102 during initialization of the information handling system 100. In addition to other initialization data, the BIOS 148 can include information that can be used to configure or enable an operating mode of the first memory access node 140 and the second memory access node 144.

Figure 2:
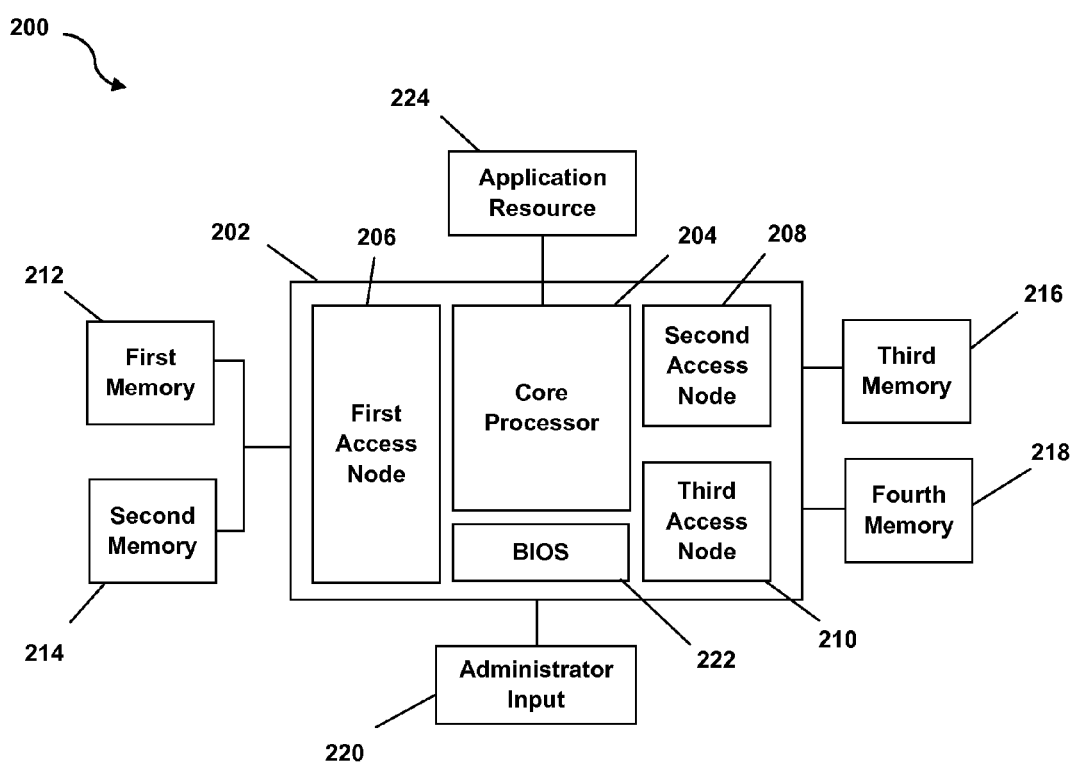
FIG. 2 illustrates a functional block diagram of processor accessing a memory via memory access node according to an aspect of the disclosure.
Figure 4:
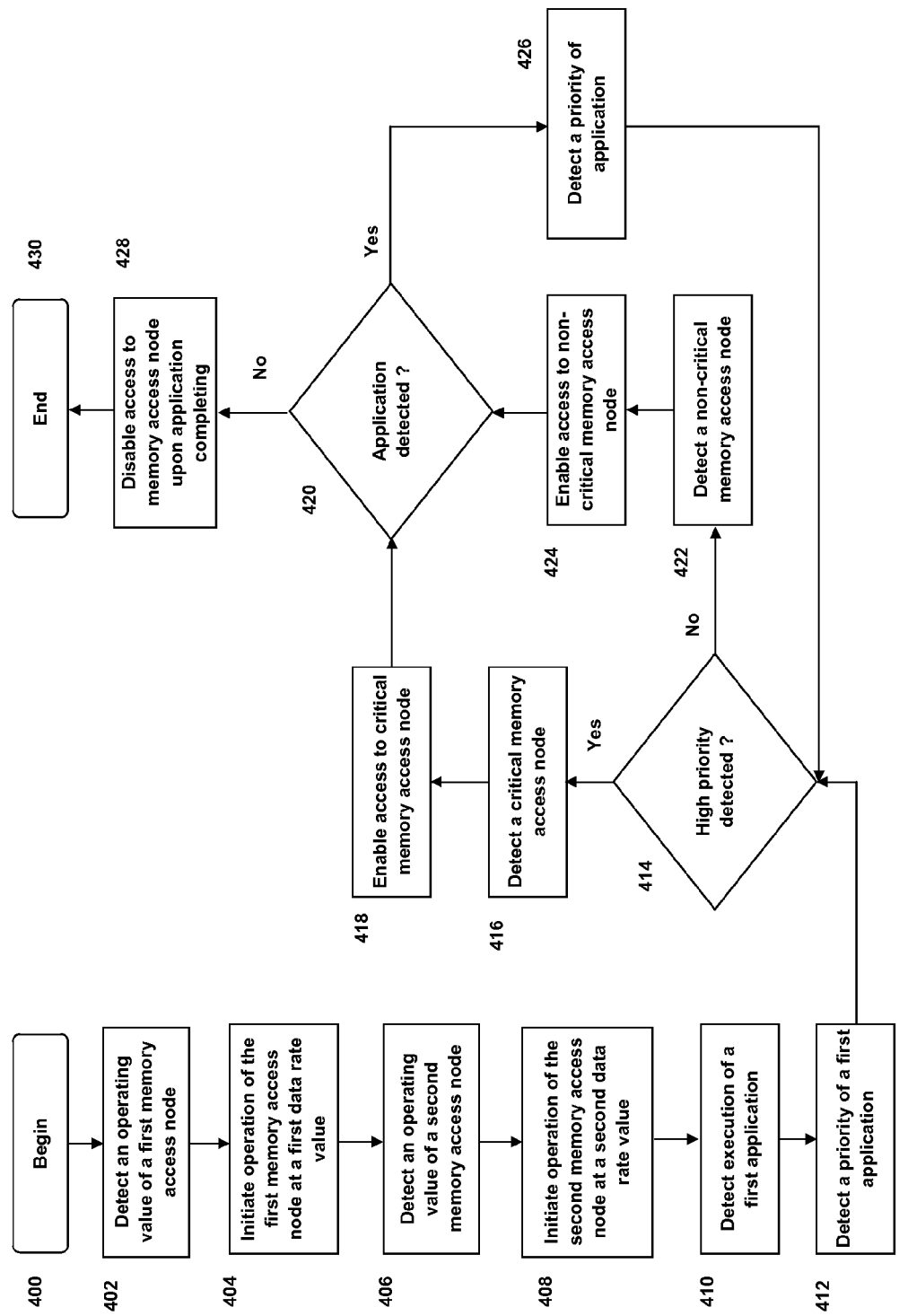
FIG. 4 illustrates a flow diagram of accessing grouped and ungrouped memory access nodes within an information handling system according to another aspect of the disclosure.

For example, the information handling system 100 can be initialized, and the BIOS 148 can provide a BIOS entry (not illustrated) to the processor 102. The BIOS 148 can include one or more entries to initialize the first memory access node 140 and the second memory access node 144 to operate at a grouped or an ungrouped memory access node. For example, the first memory access node 140 can be initialized as a grouped memory access node to facilitate increased reliability to access the first memory 142. The second memory access node 144 can be initialized as an ungrouped memory access node to facilitate performance or a higher data rate when accessing the second memory 146. Various combinations of grouping and ungrouping of the first memory access node 140 and the second memory access node 144 can be used as desired. According to one aspect, an ungrouped memory access node includes an un-ganged memory access node, and a grouped memory access node includes a ganged memory access node. A ganged or grouped memory access node includes ganging or grouping two or more memory controllers operably associated with the memory 142 and the core processor 138. An un-ganged or ungrouped memory access node includes non-grouping or un-ganging of one or more memory controllers (not illustrated) operably coupled to the first processor. FIG. 2 and FIG. 4 below describe various embodiments of grouping and ungrouping memory access nodes and memory controllers.

In one form, during run time of the processor 102, one or more applications can be executed. An application executable by the processor 102 can be a high reliability (e.g. critical) application or high performance (e.g. non-critical) application. Additionally, one or more memory access node 140, 144 can be used to access a memory 142, 146 accordingly. For example, the first memory access node 140 can be initialized as a grouped memory access node to facilitate increased reliability. As such, when the processor 102 executes a critical application, the processor 102 can use the first memory access node 140 to enable the application access to the first memory 142.

In another form, the second memory access node 144 can be enabled as an ungrouped memory access node. When the processor 102 executes a non-critical application, the processor can enable the non-critical application access to the second memory 146 using the second memory access node 144. In this manner, the information handling system 100 can ensure that critical applications can access a memory node enabled as reliable access node, and non-critical applications can access a memory node enabled as a performance enabled access node.

FIG. 2 illustrates a functional block diagram of system to access a memory via memory access node according to an aspect of the disclosure. The system, illustrated generally at 200, can include a processor 202 having a core processor 204, a first memory access node 206, a second memory access node 208, and a third memory access node 210. The memory access nodes 206, 208, 210 can be provided internal or external to the processor 202. In one form, the first memory access node 206 can be enabled as a grouped memory access node, and enables access to the first memory 212 and the second memory 214. Additionally, the second memory access node 208 can be enabled as an ungrouped memory access node and enables access to the third memory 216. The third memory access node 210 can be enabled as an ungrouped memory access node and enables access to the fourth memory 218. In one form, the memory 212, 214, 216, 218, can be provided in whole, or in part, within a single or multiple memories, memory locations, memory addresses, or any combination thereof. In another form, the memories 212, 214, 216, 218 can be provided in whole, or an part, within the processor 202, or as external memory to the processor 202, or any combination thereof.

In one form, the system 200 also includes an administrator input 220 operable to access a BIOS 222 to alter or enter one or more initialization entries or BIOS entries of the BIOS. The system 200 can further include an application resource 224 operable to store one or more applications that can be executed by the processor 202 during run time of the processor 202. The application resource 224 can include any form of storage device, such as a HDD, ODD, flash drive, network connection, or any combination thereof configurable to store applications that can be executed by the processor 202.

During operation, a system administrator can access a BIOS set-up menu (not illustrated) to enable access to one or more memory 212, 214, 216, 218, using a grouped or ungrouped memory access node. The BIOS 210 can store set-up information as BIOS entries that can be accessible to the processor 202. During initialization, the BIOS 210 can be accessed to initialize the processor 202, and one or more memory access nodes 206, 208, 210 as desired. For example, the first access node 206 can be initialized as a grouped access node allowing access to first memory 212 and second memory 214. The BIOS 210 can also include BIOS entries to initiate the second access node 208 and the third access node 210 can be initialized as ungrouped access nodes. Various other combinations of access can also be realized as desired.

Upon initializing the processor 202 and initializing one or more of the memory access nodes as grouped or ungrouped, the core processor 204 can execute one or more applications stored within the application resource 224. For example, the core processor 204 can detect a priority associated with an application to execute, and enables access to one or more memory using one or more access node. For example, a file, a table, and the like can store information identifying the application and an associated priority or other type value. The priority can include information to identify how critical information to be used in association with the application may be.

In one form, an advanced configuration and power interface (ACPI) table associated with an application can be accessed by an operating system enabled by the processor 202. The ACPI table can include a priority field and value indicating a priority level of a specific application to be executed using the processor 202. The processor 202 via the operating system can access a field within the ACPI table, and enable use of a memory access node 206 208, 210 in response to a specific value. For example, the first access node 206 can be used with applications having low priority values, and the second access node 208, and third access node 210 can be reserved to be used by applications having a high priority. In another form, an operating system can be notified of memory reliability versus performance of the system 200 using an extended static resource affinity table (SRAT). The SRAT table can include one or more entries that allow applications that may desire reliability can use access node 206, and an application that may desire performance to access node 208 or 210.

Figure 3:
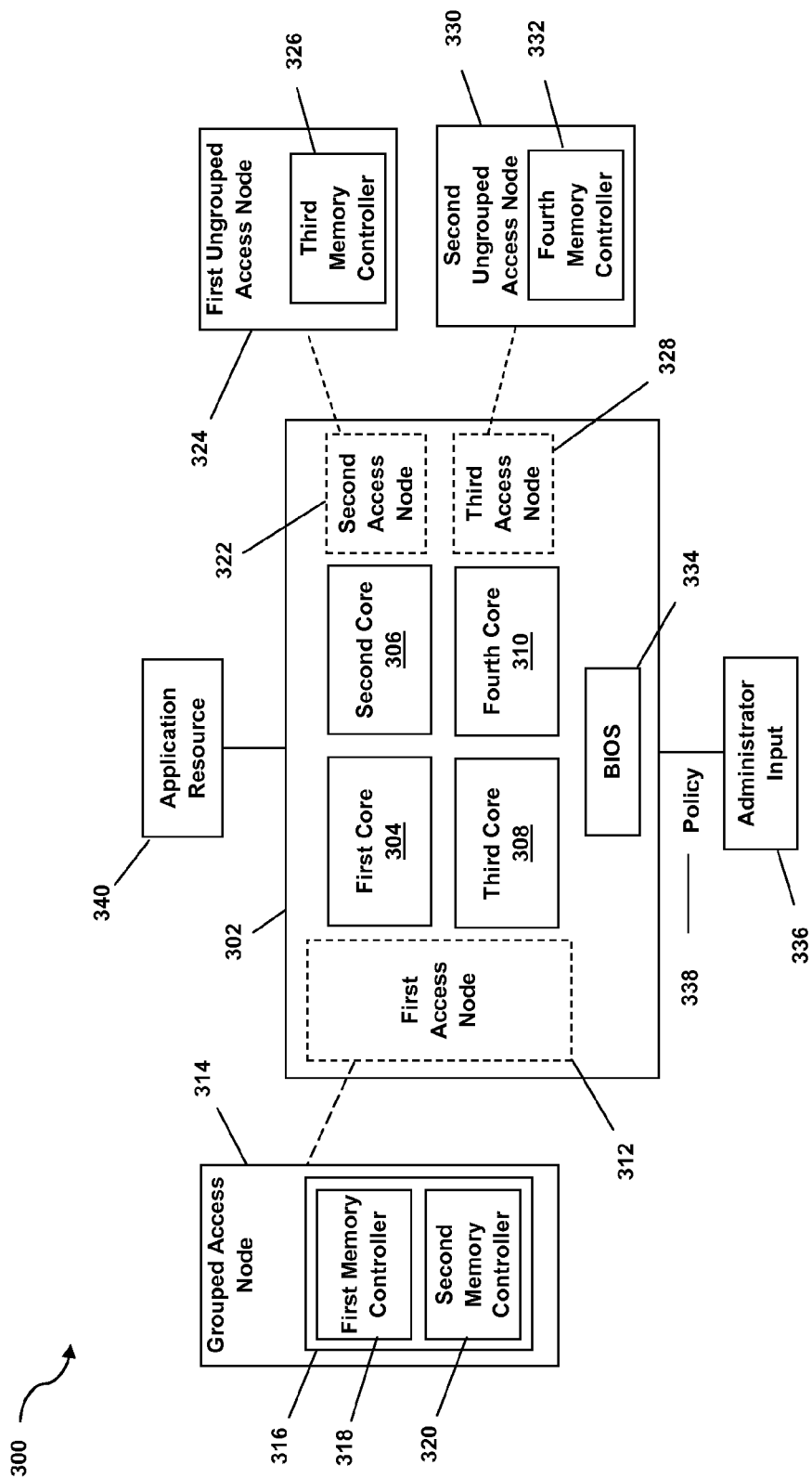
FIG. 3 illustrates a functional block diagram of multiple core processor configurable to access plural memory access nodes according to an aspect of the disclosure.

FIG. 3 illustrates a functional block diagram of multiple core processor configurable to access plural memory access nodes according to a one aspect of the disclosure. The multiple core processor, illustrated generally at 300, can include a first physical processor 302 having a first core 304, a second core 306, a third core 308, and a fourth core 310. Although illustrated as having four core processors, the multiple core processor 300 can include various multiples of core processors. Additionally, the multiple core processor 300 can be coupled to additional single or multiple core processors (not illustrated) to process data using one or more memory access node.

In one form, the multiple core processor 300 can be coupled to a first access node 312 configured as a grouped access node 314. The grouped access node 314 can include a first group of memory controller 316 including a first memory controller 318 and a second memory controller 320. The multiple core processor 300 can also be coupled to a second access node 322 including a first ungrouped memory access node 324 having a third memory controller 326. The multiple core processor 300 can further be coupled a third access node 328 configured as a second ungrouped access node 330 having a fourth memory controller 332.

In one form, the multiple core processor 300 can also be coupled to a BIOS 334 operable to enable access to one or more node 314, 324, 330, using one more BIOS entry (not illustrated). Although illustrated as a part of the physical processor 302, it should be understood that the BIOS 334 may not physically lie within or a part of the physical processor 302. The BIOS 334 can be accessed by an administrator input 336 that can be local or remote. The administrator input 336 can be used to access the BIOS 334 to modify or update one or more set-up fields within the BIOS 334. In one form, an administrator can issue a policy 338 via a network to update the BIOS 334. For example, the multiple core processor 300 can be used with a plurality or multiple core processors within one or more servers, clusters or servers, or any combination thereof. As such, a policy 338 can be communicated to multiple locations, and access nodes can be established as needed or desired.

According to a further aspect, the multiple core processor 300 can access one or more applications stored within one or more application resource 340 operable to store one or more applications that can be executed by one or more of the core processors 304, 306, 308, 310. The application resource 340 can be local or remote to the multiple core processor 300 can be accessed using a local data bus, network bus, or any combination thereof. The application resource 340 can also store information to identify a priority level or a specific application. For example, a priority level can be stored within an ACPI table that can be accessed by the multiple core processor 300, one or more of the core processor 304, 306, 308, 310, or any combination thereof, to enable access to one or more access nodes 312, 322, 328 when executing a specific application.

In one form, the multiple core processor 300 can be connected to a local bus (such as a PCI Express bus, or other type of local bus. The multiple core processor 300 can be coupled to a shared memory using one or more of the access nodes 312, 322, 328. One or more of the multiple core processors 304, 306, 308, 310, can access memory by first access a local memory on the processor itself, access a memory location proximal to the multiple core processor 300, or accessing a memory that can be remote to the multiple core microprocessor 300.

In one embodiment, one or more of the access nodes can be configured to access memory located remote to the core microprocessor 300. For example, the multiple core processor 300 can be coupled to second multiple core processor (not illustrated) and can access a memory access node of the second multiple core processor. For example, the multiple core processor 300 can be configurable to access memory local to the multiple core processor 300, and in other forms can be configured to access a memory remote to the multiple core processor. For example, the grouped memory access node 314 can be configured to use remote memory locations associated with a remote memory that, in one form, can include memory operable associated with a second multiple core processor. In this manner, a memory access node need not include only memory local to the multiple core processor 300.

FIG. 4 illustrates a flow diagram of access grouped and ungrouped memory access nodes within an information handling system according to another aspect of the disclosure. FIG. 4 can be employed in whole, or in part, by the information handling system 100 described in FIG. 1, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

The method begins generally at block 400. At block 402, an operating value of a first memory access node can be detected. For example, a BIOS can include one or more BIOS entries operable to be used to enable one or more memory access nodes as grouped memory access nodes or ungrouped memory access nodes. As such, upon detecting an operating value of the first memory access node, the method can proceed to block 404 and the first memory access node can be enabled at a first data rate value using the operating value. For example, a grouped memory access node can include a higher data rate than an ungrouped memory access node. In other forms, an ungrouped memory access node can include a data rate that can be less than a grouped data rate. In this manner, a critical applications can access an ungrouped memory access node, while a grouped memory access node can be used for non-critical applications. Upon initializing the first memory access node to a first data rate value as a grouped or ungrouped access node, the method can proceed to block 406, and detects an operating mode of a second memory access mode. The method can then proceeds to block 408, and the second memory access node can be initiated to a second data rate value. Various other combinations, numbers, and sequences of memory access nodes and data rate values can be initiated as needed or desired. Additionally, memory access nodes can be initiated together, separate, or any combination thereof.

Upon initiating the second memory access node, the method can proceed to block 410 and detects execution of a first application. For example, during run time of a processor employing an operating system, an application can be executed and detected at block 410. The method can proceed to block 412, and a priority of the first application can be detected. For example, an application can include an associated SRAT table or ACPI table that includes a priority entry that can be detected and used to enable access to one or more memory access nodes. As such, upon detecting a priority associated with an application, the method can proceed to decision block 414, and detects if a high priority entry associated with the application is detected. A high priority entry can include various values and in one form, can include a flag that can be set or unset, a bit entry, a multiple bit entry, or various other values that can be entered within a table to identify a priority. In one form a high priority can include a flag that may be set, and a low priority can include a flag that is not set.

If at decision block 414, a high priority may be detected, the method can proceed to block 416, and a critical or non-grouped memory access node can be detected. For example, a memory access node including a lower data rate can be detected. As such, access to a critical memory access node can be enabled at block 418. Upon enabling access to the critical memory access node, the method can proceed to decision block 420, and detects whether an additional or second application may be detected. In one form, a multi-task processor can execute multiple applications in parallel. As such, an additional or second application can be detected at decision block 420. Upon detecting an additional or second application, the method can proceed to block 426, and detects a priority associated with the detected application. The method can then proceed to decision block 414.

In one form, if at decision block 414, a high priority associated with an application is not detected, the method can proceed to block 422, and detects a non-critical memory access node to use with the application. For example, a non-critical memory access node can a grouped memory access node and can include a data rate that can be higher that a critical memory access node. As such, upon detecting a non-critical memory access node, the method can proceed to block 424 and access to the non-critical memory access node can be enabled and used by the application having a lower priority. The method can then proceed to decision block 420, and if an additional or second application is detected, the method can proceed as described above. If at decision block 420, a second or additional application may not be detected, the method can proceed to block 428, and access to the enabled memory access node can be disabled. For example, upon an application completing, use of one or more memory access nodes can be disabled. The method can then proceed to block 430 and the method ends. Additionally, the method can be modified to be used as applications are executed by one or more processors, multiple core processors, or any combination thereof.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of accessing memory comprising:
   detecting a first operating value of a first memory access node accessible to a first processor;
   initiating operation of the first memory access node at a first data rate value;
   initiating operation of a second memory access node at a second data rate value, wherein the second data rate value is different from the first data rate value;
   enabling a first application access to either the first memory access node or the second memory access node via an operating system enabled by the processor;
   initiating a grouped operating mode of the first memory access node accessible to the first processor using a first BIOS entry;
   initiating an ungrouped operating mode of a second memory access node accessible to a second processor using a second BIOS entry;
   enabling a second application having a second priority access to the first memory access node using the first processor; and
   enabling a critical application access to the second memory access node using the second processor.

2. The method of claim 1, further comprising:
   detecting the first application is a first application having a first priority;
   detecting the first memory access node is a first priority enabled memory access node; and
   enabling the first application access to the first memory access node.

3. The method of claim 1, further comprising:
   detecting the first application is a first application having a second priority;
   detecting the second memory access node is a second priority enabled memory access node; and
   enabling the first application access to the second memory access node.

4. The method of claim 3, further comprising:
   enabling the second memory access node at a second data rate that is greater than the first data rate;
   detecting a second application having a second priority, wherein the second priority is lower than the first priority; and
   enabling the second application access to the second memory access node.

5. The method of claim 4, further comprising:
   detecting the first memory access node as an ungrouped memory access node; and
   detecting the second memory access node as a grouped memory access node.

6. The method of clam 4, further comprising:
   enabling the first application access to the first memory access node using a first input table accessible to the operating system; and
   enabling the second application access to the second memory access node using a second input table accessible to the operating system.

7. The method of claim 1, further comprising:
   detecting the first memory access node is a first priority enabled memory access node;
   altering the first data rate of the first memory access node to a lower data rate; and
   identifying the first memory access node as a second priority enabled memory access node.

8. The method of claim 7, further comprising:
   updating a table including a control table value to identify the first memory access node as the second priority enabled memory node; and
   enabling a second application access to the first memory access node via the operating system.

9. The method of claim 1, further comprising:
   detecting an availability of a multiple core processor, wherein the multiple core processor includes the first processor, a second processor, a third processor, and a fourth processor;
   accessing a BIOS to detect an operating mode of the first memory access node, a second memory access node, and a third memory access node;
   enabling the first processor and the second processor access to the first memory access node using a first BIOS entry;
   enabling the third processor access to the second memory access node using a second BIOS entry; and
   enabling the fourth processor access to the third memory access node using the third BIOS entry.

10. A multiple core processor comprising:
    a first processor configured to access a first memory access node at a first data rate, wherein the first processor is further configured to be responsive to a first BIOS entry operable to enable access to the first memory access node;
    a second processor configured to access a second memory access node at a second data rate, wherein the second processor is further configured to be responsive to a second BIOS entry operable to enable access to the first memory access node;
    wherein the first data rate is different from the second data rate;

wherein the first processor is further configured to enable a first application access to the first memory access node using a first table accessible by the operating system during a run time; and wherein the second processor is further configured to enable a second application access to the second memory access node using a second table accessible by the operating system during the run time.

11. The multiple core processor of claim 10, further comprising:

wherein the first processor is further configured to process a first application and to enable the first application use of the first memory access node in response to first priority value of the first application; and wherein the second processor is further configured to process a second application and to enable the second application use of the second memory access node in response to a second priority value of the second application.

12. The multiple core processor of claim 10, further comprising:

wherein the first memory access node is an ungrouped memory access node; and wherein the second memory access node is a grouped memory access node.

13. The multiple core processor of claim 10, further comprising:

a first memory controller coupled to the first processor and the first memory access node, the first memory controller operable to be enabled as a grouped memory access node or a non-grouped memory access node in response to the first BIOS entry; and a second memory controller coupled to the second processor and the second memory access node, the second memory controller operable to be enabled as a second grouped memory access node or a second non-grouped memory access node in response to the second BIOS entry.

14. The multiple core processor of claim 13, further comprising wherein the first memory controller is configurable to be coupled to the first memory access node and the second memory controller to form the grouped memory access node.

15. An information handling system comprising:

a first processor configurable to access a grouped memory access node using a first BIOS entry of a BIOS;

a second processor configurable to access a first ungrouped memory access node using a second BIOS entry of the BIOS;

a first table accessible during a run time, wherein the first table is configured to enable a first application having a first priority access to the grouped memory access node;

a second table accessible during the run time, wherein the second table is configured to enable a second application access to the first ungrouped memory access node;

a first memory controller operably coupled to the grouped memory access node and the first processor;

a second memory controller configured to be grouped with the first memory controller to enable the grouped memory access node; and a third memory controller operably coupled to the first ungrouped memory access node.

16. The information handling system of claim 15, further comprising:

a third processor configured to be coupled to the grouped memory access node; and a fourth processor configured to be coupled to a second ungrouped memory access node.

17. The information handling system of claim 16, further comprising a fourth memory controller operable coupled to the second ungrouped memory access node and the fourth processor.

* * * * *